United States Patent
Choi et al.

(10) Patent No.: US 6,459,846 B1
(45) Date of Patent: Oct. 1, 2002

(54) COMPLEX RARE-EARTHS DOPED OPTICAL WAVEGUIDE

(75) Inventors: Yong Gyu Choi, Taejon; Dong Sung Lim, Kyonggi-do; Kyong Hon Kim; Hak Kyu Lee, both of Taejon, all of (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/498,321

(22) Filed: Feb. 4, 2000

(30) Foreign Application Priority Data

Dec. 3, 1999 (KR) ............................. 99-54902

(51) Int. Cl.[7] .............................................. G02B 6/00
(52) U.S. Cl. ................................................. 385/142
(58) Field of Search ..................... 385/142, 11, 147, 385/126, 141–145, 130; 37/40, 6, 39, 64; 501/37, 40; 359/341.3, 341.4, 341.5

(56) References Cited

U.S. PATENT DOCUMENTS

| | | | |
|---|---|---|---|
| 4,923,279 A | | 5/1990 | Ainslie et al. ............. 350/96.3 |
| 5,274,734 A | | 12/1993 | Jin et al. ..................... 385/142 |
| 5,668,659 A | * | 9/1997 | Sakamoto et al. ........... 359/341 |
| 6,122,429 A | * | 9/2000 | Wessels et al. ............. 385/130 |
| 6,151,429 A | * | 11/2000 | Kristensen et al. ............ 385/11 |
| 6,226,308 B1 | * | 5/2001 | Samson et al. ................ 372/40 |
| 6,288,835 B1 | * | 9/2001 | Nilsson et al. ............ 359/341.3 |

OTHER PUBLICATIONS

Ainslie et al., "The Absorption and Fluorescence Spectra of Rare Earth Ions in Silica–Based Monomode Fibre," *Journal of Lightwave Technology*, 6(2):287–293, Feb., 1988.

Diggonet, "Closed Form Expressions for the Gain in Three– and Four–Level Laser Fibers," *IEEE Journal of Quantum Electronics*, 26(10):1788–1796, Oct., 1990.

Sakamoto et al., "35–dB Gain Tm–Doped ZBLYAN Fiber Amplifier Operting at 1.65 um," *IEEE Photonics Technology Letters*, 8(3):349–351, Mar., 1996.

* cited by examiner

*Primary Examiner*—Akm E. Ullah
(74) *Attorney, Agent, or Firm*—SEED IP Law Group PLLC

(57) ABSTRACT

The present invention relates to a complex rare-earths doped optical waveguide. In particular, the complex rare-earths doped optical waveguide in accordance with an embodiment of the present invention is for modifying emission spectrum of erbium that is able to obtain gain from shorter wavelength than 1530 nm. A complex rare-earths doped optical wavelength is provided. The complex rare-earths doped optical waveguide in accordance with an embodiment of the present invention includes clad and core. The core is doped with erbium (Er) ion. The internal or surface of the core is doped with at least one complex rare-earth ions. The internal and the surface of the core is distanced by certain length from center of the core.

11 Claims, 2 Drawing Sheets

COMPLEX RARE-EARTHS DOPED OPTICAL WAVEGUIDE

TECHNICAL FIELD

The present invention relates to a complex rare-earths doped optical waveguide. In particular, the complex rare-earths doped optical waveguide in accordance with an embodiment of the present invention is for modifying emission spectrum of erbium that is able to significantly enhance optical gain from shorter wavelength than 1530 nm.

BACKGROUND OF THE INVENTION

Wavelength division multiplexing method has been studied as a core technology for satisfying increasing demand in the area of optical communication networks. Likewise, optical amplifiers with broadband gain are needed.

Currently, gain wavelength of erbium doped silica optical amplifier is fixed over 1530 nm. Also, in order to amplify other wavelength regions, optical gain is obtained at ~1300 nm, ~1470 nm, and ~1650 nm by employing praseodymium (Pr) ion and thulium (Tm) ion, respectively.

Erbium ion is an efficient gain medium. Since erbium results in a conspicuous gain when configured to optical fiber amplifiers regardless of host compositions of the optical fibers, many studies have been performed to obtain gain at shorter wavelength than 1530 nm by employing erbium ion.

When erbium ion dopes a crystal or a glass, it is excited by light or electricity and as a result, fluorescent emission in 1460~1650 nm is evident, which is from $^4I_{13/2} \rightarrow {}^4I_{15/2}$ transition.

Gain wavelength of conventional erbium doped optical fiber amplifiers is between 1530 nm and 1600 nm and it is difficult for conventional erbium doped optical fiber amplifiers to obtain gain at wavelength shorter than 1530 nm. It is because that the emission cross-section of $^4I_{13/2} \rightarrow {}^4I_{15/2}$ transition is small at wavelength shorter than 1530 nm.

Generally, spectral lineshape of a gain spectrum is similar to shape of the amplified spontaneous emission spectrum, it is difficult for conventional erbium doped optical fiber amplifiers to obtain gain at wavelength shorter than 1530 nm.

SUMMARY OF THE INVENTION

A complex rare-earths doped optical waveguide is provided. The complex rare-earths doped optical waveguide in accordance with an embodiment of the present invention includes clad and core. The core is doped with erbium (Er) ion. The interior or exterior region of the core is doped with at least one of complex rare-earth ions. The interior and (or) the exterior region of the core, where the rare-earth ion (s) dope (s), is at a certain distance apart from the erbium-doped region.

Preferably, the complex rare-earth ion is thulium (Tm), terbium (Tb), dysprosium (Dy), or neodymium (Nd).

Preferably, erbium (Er) is doped within certain length from center of the core.

Preferably, the interior and (or) exterior of the core is doped with at least one complex rare-earth ion.

Preferably, a layer doped with at least one complex rare-earth ion wraps the erbium-doped layer of the core.

Preferably, distance between the erbium doped layer and the complex rare-earths doped layer is farther than 20 nm.

A complex rare-earths doped optical waveguide is provided. The. complex rare-earths doped optical waveguide in accordance with an embodiment of the present invention includes clad and core. In the whole region or in a fraction of the core are doped combination of erbium (Er) ion and ytterbium (Yb) ion. A layer, a certain distance apart from the erbium/ytterbium-doped layer is introduced and the layer is doped with at least one complex rare-earth ion.

Preferably, the complex rare-earth ion is thulium (Tm), terbium (Tb), dysprosium (Dy), or neodymium (Nd).

Preferably, erbium (Er) and ytterbium (Yb) are codoped in the core.

Preferably, the internal or the surface of the core is doped with at least one complex rare-earths ion.

Preferably, the internal or the surface of the core is wrapped by at least one complex rare-earths ion.

Preferably, distance between the erbium (Er) and ytterbium (Yb) codoped layer and the complex rare-earths doped layer is farther than 20 nm.

A complex rare-earths doped optical waveguide is provided. The complex rare-earths doped optical waveguide in accordance with an embodiment of the present invention includes clad and core. The core is doped with erbium (Er) ion and part of the clad is doped with at least one complex rare-earths ion.

Preferably, the complex rare-earths ion is thulium (Tm), terbium (Tb), dysprosium (Dy), or neodymium (Nd).

A complex rare-earths doped optical waveguide is provided. The complex rare-earths doped optical waveguide in accordance with an embodiment of the present invention includes clad and core. The core is doped with combination of erbium (Er) ion and ytterbium (Yb) ion and part of the clad is doped with at least one complex rare-earths ion. A complex rare-earths doped layer is introduced apart a certain distance from the core, in the clad region.

Preferably, the complex rare-earths ion is thulium (Tm), terbium (Tb), dysprosium (Dy), or neodymium (Nd).

BRIEF DESCRIPTION OF THE DRAWINGS

The embodiments of the present invention will be explained with reference to the accompanying drawings, in which.

DETAILED DESCRIPTION OF THE INVENTION

Figure 1:
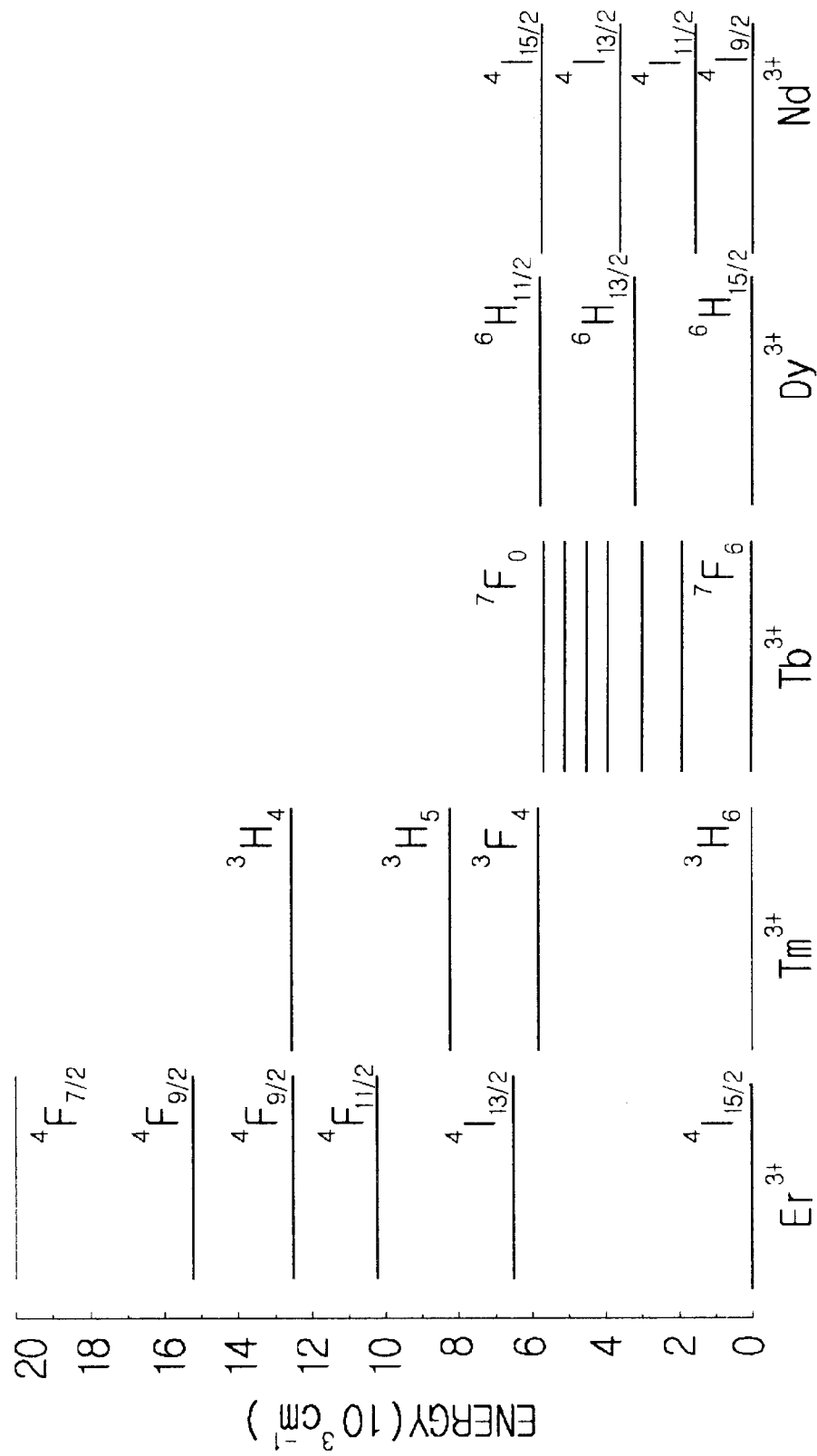
FIG. 1 is a graph illustrating energy level of erbium (Er), thulium (Tm), terbium (Tb), dysprosium (Dy), and neodymium (Nd)

Generally, there are two ways of energy transfer between rare-earth ions. One is radiative energy transfer and the other is nonradiative energy transfer.

Nonradiative energy transfer actively happens when the distance between ions is close, that is, when the ions are doped together. Mainly, the energy transfer is caused by electric dipole-dipole effect and the magnitude of the interaction is proportional to minus sixth power of the distance between ions. On the other hand, in radiative energy transfer, the emitted fluorescence is transferred as a form of photon and then is absorbed. The magnitude of the interaction is proportional to minus second power of the distance between ions. Therefore, as the distance between ions increases, influence of nonradiative energy transfer decreases rapidly and influence of radiative energy transfer increases.

One common feature of the two energy transfers is that transferred energy is always same. That is, there exists energy resonance. In case of nonradiative energy transfer, fluorescent lifetime of corresponding energy level decreases, even though shape of fluorescent emission spectrum is not changed at all. In case of radiative energy transfer, fluorescent lifetime of corresponding energy level is not changed and observed fluorescent emission spectrum depends upon the absorption lineshape of ion that absorbs energy. Therefore, in order to change lineshape of the emitted spectrum without decreasing fluorescent lifetime of erbium ion, nonradiative energy transfer needs to be suppressed and only radiative energy transfer should be activated. By this reason, the layer in which erbium is added, should be separated by a certain distance from the layer in which ions interested in this invention are added. In detail, since the distance in which nonradiative energy transfer actively happens is tens of nm, the distance of separation has to be larger than the tens of nm.

In an embodiment of the present invention, even though distance between the erbium doped layer and the layer doped with rare-earth ion of interest is designed as 200 nm, the purpose of the present invention was accomplished with the distance from 20 nm on the basis of experiment.

Also, in addition to the case in which the erbium doped layer and the layer in which rare-earth ion is added, same effect was achieved with the case erbium is doped at all area of the core and rare-earth ion doped layer is made in the clad.

Following examples illustrate how to suppress amplified spontaneous emission.

First, Sakamoto et al. published '35-dB gain Tm-doped ZBLYAN fiber amplifier operating at 1.65 μm at IEEE Photonics Technology Letters, 8(3), 349~351 in 1996. In the experiment performed, the core is doped by thulium (Tm) and the clad is doped by terbium (Tb). As a result, center of fluorescent emission spectrum of thulium (Tm) was shifted from 1800 nm to 1650 nm. That is, when thulium (Tm) was added, 35 dB gain was achieved with terbium (Tb) at 1650 nm band. This implies that gain at 1650 nm band is improved by suppressing amplified spontaneous emission at 1800 nm band.

Second, band pass filters may be applied to suppress amplified spontaneous emission at unwanted wavelength. According to experiments, 35 dB gain was achieved by employing an erbium doped silica optical fiber amplifier with an optical band pass fiber-type filter, which selectively passes wavelength between 1500 nm and 1525 nm. This means there is 20 dB gain improvement in comparison with the case in which band pass filters are not utilized. The filters only suppress amplified spontaneous emission that has been accumulated before the filters, which means filters themselves cannot prevent amplified spontaneous emission power before it.

On the other hand, if rare-earth doped layer that absorbs wavelengths over 1530 nm is implemented around the core, fluorescence is absorbed constantly throughout the optical fiber and amplified spontaneous emission is efficiently prevented. Lasing effect is usually occurred at a wavelength where stimulated emission cross-section is at its maximum value. In the embodiment of this invention, such a lasing effect can also be avoided and even though pump power increases, gain is not saturated.

By the way, there are a few requirements for rare-earth ion that absorbs wavelengths longer than 1530 nm. First, the rare-earth ion should employ energy level that represents ground state absorption at wavelengths longer than 1530 nm. Second, the rare-earth ion should be able to emit the absorbed energy as a form of multiphonon relaxation mechanism. Third, the rare-earth ion should absorb as small as possible at 980 nm range and 1480 nm range.

FIG. 1 is a graph illustrating energy level of erbium (Er), thulium (Tm), terbium (Tb), dysprosium (Dy), and neodymium (Nd). The rare-earths ions illustrated in FIG. 1 follow the basic purpose of the present invention.

Figure 2:
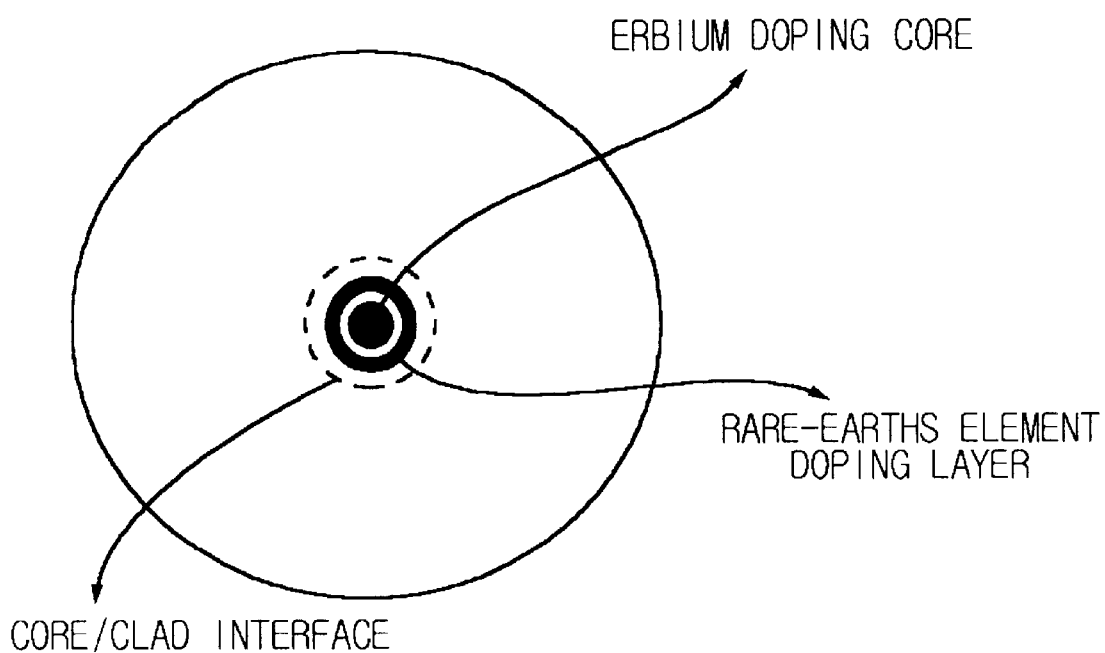
FIG. 2 is a cross sectional view illustrating complex rare-earths doped optical fiber in accordance with an embodiment of the present invention.
Figure 3:
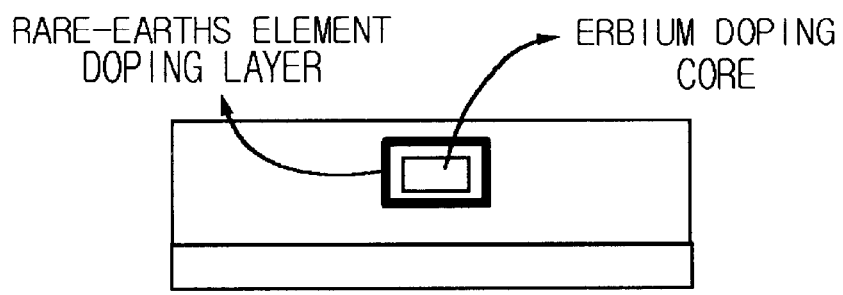
FIG. 3 is across sectional view illustrating complex rare-earths doped optical waveguide in accordance with an embodiment of the present invention.

FIG. 2 is a cross sectional view illustrating complex rare-earths doped optical fiber in accordance with an embodiment of the present invention. FIG. 3 is a cross sectional view illustrating complex rare-earths doped optical waveguide in accordance with an embodiment of the present invention.

Following conditions should be considered for a part in which rare-earth ions absorbing wavelengths longer than 1530 nm are added.

First, in case of rare-earths ions that absorbs small at wavelengths shorter than 1530 nm and at wavelength of 980 nm, erbium ion is added at the center of the core and the rare-earths ions should be added inside of the core which is separated from the added layer at least 20 nm. FIG. 2 illustrates the structure of the optical fiber with such condition.

The advantages of the optical fiber shown in FIG. 2 are as follows. First, erbium ion is able to absorb excitation light efficiently. Second, since rare-earth doped layer is located in the core, spontaneous emission is efficiently suppressed. Third, the optical fiber may be utilized for multi-mode optical fibers as well as single-mode optical fibers.

Even though erbium ion may be added alone, erbium and ytterbium are combined and added together for improved performance.

Second, it is a case when added rare-earths ions have large absorption at 980 nm band, usually adopted as excitation wavelength for erbium doped optical fiber amplifiers or lasers. However, these rare-earth ions are able to suppress excitation light loss of 980 nm by adjusting distance between core layer and rare-earths layer. It is based upon the fact mode field diameter increases as wavelength gets longer. That is, 1530 nm wavelength is more related to the clad than 980 nm wavelength. Therefore, the distance between the core layer and the absorption rare-earths layer maybe calculated in consideration with core radius and numerical aperture of optical fibers. That is, cutoff wavelength of the optical fiber is shorter than 980 nm. Wavelength bandwidth and amplification wavelength bandwidth are all single mode conditions. In each wavelength, the portion propagated throughout the clad is described as $(1-\eta)$ and $\eta$ represents confinement factor. Following equation 1 describes $\eta$ mathematically.

$$\eta = 1 - \exp\left[-\left(\frac{a}{w}\right)^2\right] \quad \text{[Equation 1]}$$

a: radius of core
w: mode radius of core, radius until mode intensity passing the core decreases to $1/e^2$ Following equation 2 illustrates mode radius 2.

$w = a(0.46 + 1.145V_\lambda^{-1.5} + 2.036_\lambda^{-6})$ [Equation 2] $V_\lambda$: normalized frequency at wavelength $\lambda$, $$\frac{2\pi aNA}{\lambda}.$$

Explanation in detail regarding equation 1 and equation 2 is described at 'Closed-form expressions for the gain in three- and four- level laser fibers', IEEE Journal of Quantum Electronics, "M. J. Digonnet".

Now, relative fraction of ion propagating through the clad at 980 wavelength bandwidth and 1530 wavelength bandwidth is obtained and on the basis of the branching ratio, 980 nm bandwidth should be formed with a certain distance to make sure not overlapping with absorption rare-earths ion layer. In addition, absorption cross-section of doped rare-earths at 980 nm and over 1530 nm should be considered. It is because that absorption rate at each wavelength is proportional to (absorption cross-section)×(1−η). Therefore, when an optical fiber in accordance with an embodiment of the present invention is manufactured, various factors should be considered to determine doped layer of rare-earths ion.

The content of the present invention may be applied to an optical waveguide as well as optical fiber and an embodiment of the case is illustrated at FIG. 3.

Shape of doped rare-earths layer shouldn't have to be circular shape in case of optical fibers. Likewise, in case of flat optical waveguides, shape of doped rare-earths layer shouldn't have to be similar to the shape of the core. However, the distance between erbium ion of the core and codoping rare-earths ion of the clad should be far enough for not having nonradiative energy transfer and close enough for having radiative energy transfer. That is, when light over 1530 nm advances to the core with single mode, mode field diameter has to be overlapped with codoping rare-earths ion layer.

The amount of added rare-earths ion may be determined by following standard. First, when absorption rare-earths ion is added to the core, the amount of absorption rare-earths ion is proportional to the amount of erbium and inverse proportional to confinement factor of light over 1530 nm. That is, the amount of added rare-earths ion is proportional to density of erbium ion ×1/η. Second, when absorption rare-earths ion is added to the clad, the amount of added rare-earths ion is proportional to density of erbium ion ×1/(1−η). Exact proportional constant is determined through experiments. If the amount of absorption rare-earths ion increases, gain may decrease because absorption at signal wavelength may increase. Therefore, maximum amount of absorption rare-earths ion is determined.

As stated above, in an embodiment of the present invention, an optical waveguide is provided, in which erbium is added to the core and rare-earths ions such as thorium.(Tm), terbium (Tb), dysprosium (Dy), and neodymium (Nd) are added to a part of the clad together or alone. Therefore, an embodiment of the present invention accomplishes gain at wavelengths shorter than ones from which conventional erbium doped amplifiers or lasers accomplish gain.

Although representative embodiments of the present invention have been disclosed for illustrative purpose, those who are skilled in the art will appreciate that various modifications, additions and substitutions are possible without departing from the scope and spirit of the present invention as defined in the accompanying claims.

We claim:

1. A complex rare-earth doped optical waveguide, comprising:

a clad; and a core having a layer doped with Erbium (Er) ions, the core comprising a layer doped with at least one type of complex rare-earth ion at a certain distance apart from the Erbium-doped layer, wherein the layer doped with at least one type of complex rare-earth ion wraps the Erbium-doped layer.

2. The optical waveguide of claim 1, wherein the complex rare-earth ion is selected from the group consisting of Thulium (Tm), Terbium (Tb), Dysprosium (Dy), and Neodymium (Nd).

3. The optical waveguide of claim 2, wherein the distance between the Erbium doped layer and the complex rare-earth doped layer is greater than 20 nm.

4. A complex rare-earth doped optical waveguide comprising: a clad and a core including a layer doped with a combination of Erbium (Er) ion and Ytterbium (Yb) ion, the core comprising:

a layer doped with at least one of complex rare-earth ion at a certain distance apart from the Er and Yb doped layer within the core, wherein the layer doped with at least one of complex rare-earth ion wraps the Er and Yb doped layer.

5. The optical waveguide of claim 4, wherein the complex rare-earth ion is selected from the group consisting of Thulium (Tm), Terbium (Tb), Dysprosium (Dy), and Neodymium (Nd).

6. The optical waveguide of claim 4, wherein the Erbium (Er) ion and the Ytterbium (Yb) ion are co-doped in the core.

7. The optical waveguide of claim 5, wherein a distance between the Erbium (Er) and the Ytterbium (Yb) co-doped layer and the complex rare-earth doped area is greater than 20 nm.

8. A complex rare-earth doped optical waveguide comprising: a clad and a core including an Erbium (Er) doped layer, the clad comprising a layer doped with at least one of complex rare-earth ion at a certain distance apart from the Er doped layer.

9. The optical waveguide of claim 8, wherein the complex rare-earth ion is selected from the group consisting of Thulium (Tm), Terbium (Tb), Dysprosium (Dy), and Neodymium (Nd).

10. A complex rare-earth doped optical waveguide having a clad and a core including a layer doped with a combination of Erbium (Er) ion and Ytterbium (Yb) ion, the clad comprising:

a layer doped with at least one of complex rare-earth ion at a certain distance apart from the Er doped layer.

11. The optical waveguide of claim 10, wherein the complex rare-earth ion is selected from the group consisting Thulium (Tm), Terbium (Tb), Dysprosium (Dy), and Neodymium (Nd).

* * * * *